(12) United States Patent
Mizoguchi

(10) Patent No.: US 11,084,492 B2
(45) Date of Patent: Aug. 10, 2021

(54) AUTOMATED DRIVING ASSIST APPARATUS

(71) Applicant: SUBARU CORPORATION, Tokyo (JP)

(72) Inventor: Masato Mizoguchi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 245 days.

(21) Appl. No.: 16/435,087

(22) Filed: Jun. 7, 2019

(65) Prior Publication Data

US 2020/0070834 A1 Mar. 5, 2020

(30) Foreign Application Priority Data

Aug. 31, 2018 (JP) .............................. JP2018-162517

(51) Int. Cl.
*B60W 30/18* (2012.01)
*G08G 1/01* (2006.01)

(52) U.S. Cl.
CPC ....... *B60W 30/18163* (2013.01); *G08G 1/012* (2013.01); *G08G 1/0125* (2013.01); *B60W 2554/80* (2020.02)

(58) Field of Classification Search
CPC ........ B60W 30/18163; B60W 2554/80; G08G 1/012; G08G 1/0125
See application file for complete search history.

(56) References Cited

U.S. PATENT DOCUMENTS

2005/0015203 A1* 1/2005 Nishira .................. G08G 1/167
701/301

FOREIGN PATENT DOCUMENTS

| JP | 2006-053109 A | 2/2006 |
| JP | 2014-067165 A | 4/2014 |
| JP | 2015-224929 A | 12/2015 |

OTHER PUBLICATIONS

Japanese Notice of Reasons for Refusal issued in corresponding Japanese Patent Application No. 2018-162517, dated Jun. 9, 2020, with English translation.

* cited by examiner

*Primary Examiner* — Tyler J Lee
*Assistant Examiner* — Yufeng Zhang
(74) *Attorney, Agent, or Firm* — McDermott Will & Emery LLP

(57) ABSTRACT

An automated driving assist apparatus includes a traffic information acquirer, a traffic congestion determiner, a distance comparator, a lane-change start determiner, and a lane-change controller. When the traffic congestion determiner determines that a passing lane adjacent to a lane regulation zone is congested, the distance comparator calculates a distance to the lane regulation zone and an estimated distance to a traffic queue based on road traffic information acquired by the traffic information acquirer, and compares the distance to the lane regulation zone with the estimated distance to the traffic queue. When the distance to the lane regulation zone is longer than the estimated distance to the traffic queue, the lane-change start determiner determines whether the estimated distance to the traffic queue reaches a lane-change start distance. When the estimated distance to the traffic queue reaches the lane-change start distance, the lane-change controller causes the own vehicle to change lanes.

17 Claims, 7 Drawing Sheets

AUTOMATED DRIVING ASSIST APPARATUS

CROSS-REFERENCE TO RELATED APPLICATIONS

The present application claims priority from Japanese Patent Application No. 2018-162517 filed on Aug. 31, 2018, the entire contents of which are hereby incorporated by reference.

BACKGROUND

The technology relates to an automated driving assist apparatus for a vehicle.

In a case where a lane regulation zone is set ahead of an own vehicle automatically traveling on a traveling lane by road construction or accidents, for example, and where the own vehicle is forced to travel only on a passing lane, the own vehicle needs to be controlled to travel avoiding the lane regulation zone.

For example, Japanese Unexamined Patent Application Publication (JP-A) No. 2014-67165 discloses a technique for determining, on the basis of information on a construction zone received via an intervehicle communication or a road-to-vehicle communication, whether the construction zone is present on a traveling course along which an own vehicle is traveling. In a case where the construction zone is present, it is determined whether the construction zone is present on a traveling lane on which the own vehicle is traveling. In a case where the construction zone is present on the traveling lane on which the own vehicle is traveling, the traveling trajectory of the own vehicle is corrected. When coming close to the construction zone, the own vehicle is caused to travel along the corrected traveling trajectory to pass by the construction zone.

SUMMARY

An aspect of the technology provides an automated driving assist apparatus including: a traveling-environment-information acquirer configured to acquire a front traveling environment in front of an own vehicle; a traffic information acquirer configured to acquire, from a central controller, road traffic information covering a target traveling course on which the own vehicle is to automatically travel; a traffic congestion determiner configured to determine, on a basis of the road traffic information acquired by the traffic information acquirer, whether a lane regulation zone is set on the target traveling course, and to determine, in a case where the lane regulation zone is set, whether a passing lane adjacent to the lane regulation zone is congested on a basis of the road traffic information acquired by the traffic information acquirer; a distance comparator configured to calculate, when the traffic congestion determiner determines that the passing lane adjacent to the lane regulation zone is congested, a distance to the lane regulation zone and an estimated distance to a traffic queue on a basis of the road traffic information acquired by the traffic information acquirer, and to compare the distance to the lane regulation zone with the estimated distance to the traffic queue, the distance to the lane regulation zone including a distance from the own vehicle to a start position of the lane regulation zone, the estimated distance to the traffic queue including an estimated distance from the own vehicle to a tail end of the traffic queue; a lane-change start determiner configured to determine, in a case where the distance comparator determines that the distance to the lane regulation zone is longer than the estimated distance to the traffic queue, whether the estimated distance to the traffic queue reaches a lane-change start distance, the lane-change start distance being preset and extending to the tail end of the traffic queue; and a lane-change controller configured to cause, when the lane-change start determiner determines that the estimated distance to the traffic queue reaches the lane-change start distance, the own vehicle to make a lane change.

An aspect of the technology provides an automated driving assist apparatus including an automated driving assist apparatus. The automated driving assist apparatus includes: a detector configured to acquire a front traveling environment in front of an own vehicle; and circuitry. The circuitry is configured to: acquire, from a central controller, road traffic information covering a target traveling course on which the own vehicle is to automatically travel; determine, on a basis of the acquired road traffic information, whether a lane regulation zone is set on the target traveling course, and determine, in a case where the lane regulation zone is set, whether a passing lane adjacent to the lane regulation zone is congested on a basis of the acquired road traffic information; calculate, when it is determined that the passing lane adjacent to the lane regulation zone is congested, a distance to the lane regulation zone and an estimated distance to a traffic queue on a basis of the acquired road traffic information, the distance to the lane regulation zone comprising a distance from the own vehicle to a start position of the lane regulation zone, the estimated distance to the traffic queue comprising an estimated distance from the own vehicle to a tail end of the traffic queue; compare the distance to the lane regulation zone with the estimated distance to the traffic queue; determine, when it is determined that the distance to the lane regulation zone is longer than the estimated distance to the traffic queue, whether the estimated distance to the traffic queue reaches a lane-change start distance, the lane-change start distance being preset and extending from the own vehicle to the tail end of the traffic queue; and cause, when it is determined that the estimated distance to the traffic queue reaches the lane-change start distance, the own vehicle to make a lane change.

BRIEF DESCRIPTION OF THE DRAWINGS

The accompanying drawings are included to provide a further understanding of the technology and are incorporated in and constitute a part of this specification. The drawings illustrate example embodiments and, together with the specification, serve to explain the principles of the technology. The drawings are schematic and are not intended to be drawn to scale.

DETAILED DESCRIPTION

Figure 1A:
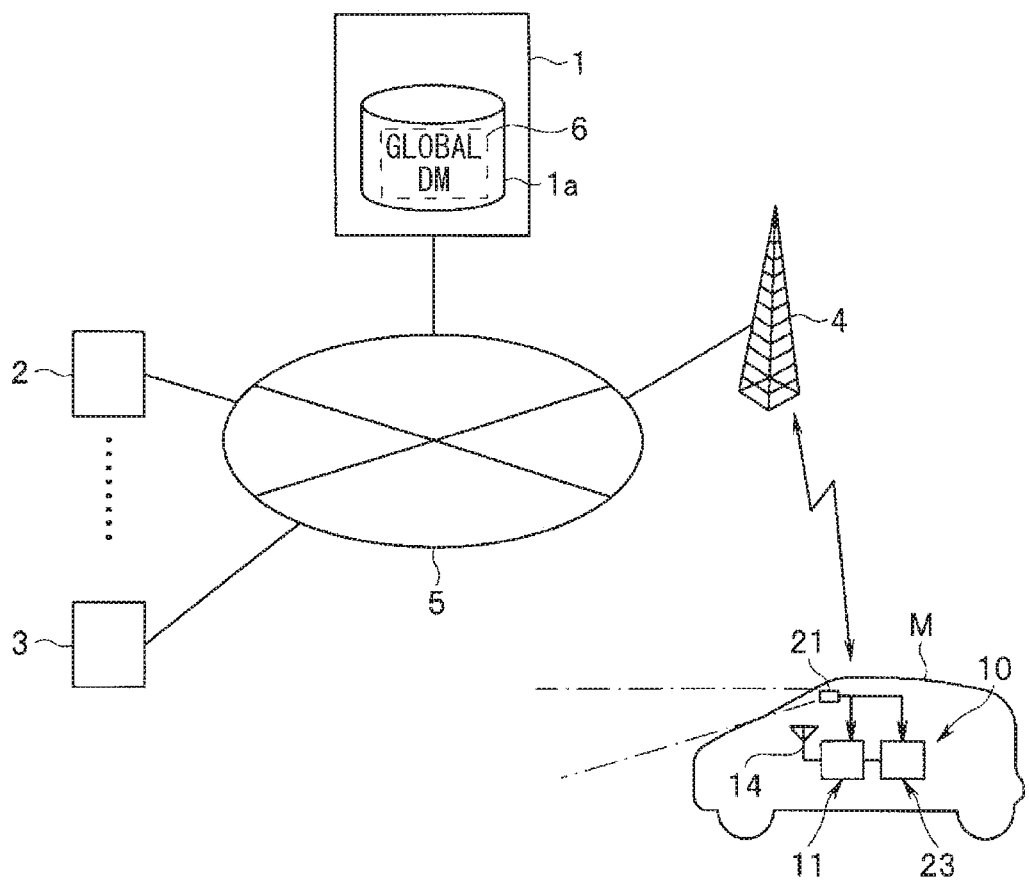
FIG. 1A is a diagram illustrating an example outline configuration of a map information providing system according to one example embodiment of the technology.

In the following, some embodiments of the technology are described with reference to the accompanying drawings. Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the technology are optional and may be provided on an as-needed basis. Throughout the present specification and the drawings, elements having substantially the same function and configuration are denoted with the same numerals to avoid any redundant description.

It is possible to apply the technique disclosed in JP-A No. 2014-67165 to a situation where a road is relatively vacant and vehicles are allowed to pass by a lane regulation zone, if any, without being caught in traffic congestion.

On the other hand, it is highly difficult to apply the typical technique disclosed in JP-A No. 2014-67165 to a situation where a road is relatively congested and vehicles are forced to travel only on a passing lane on which vehicle are concentrated to generate traffic congestion, for example. Making a lane change using the typical technique in such a situation generates the necessity for automatic control that causes an own vehicle to interrupt a traffic queue of vehicles. Such an automatic interruption, however, is particularly difficult to achieve.

In such a situation, the own vehicle is decelerated or stopped at a position backward from a lane regulation zone (e.g., a zone under construction or a zone in which an accident has happened) by automatic brake control, and the automated driving is temporarily cancelled to make a driver to take over the driving operation. However, even if the driver is notified of the cancellation of the automatic driving by a sound or an indicator on a monitor screen, it is difficult to achieve a smooth lane change. This can make the driver experience a feeling of strangeness.

One possible measure to maintain the automated driving without canceling the automated driving may involve acquiring, at an early timing, information on lane regulation and traffic congestion due to a zone through which vehicle are prohibited from traveling, causing the own vehicle to make a lane change at a position as far backward from the tail end of a traffic queue of vehicles as possible, and causing the own vehicle to travel following a vehicle at the tail end of the traffic queue of vehicles.

However, in a situation where the own vehicle is traveling in a relatively vacant region of the road backward from the congested zone, making a lane change at an early timing and continuously traveling on the passing lane can violate any applicable laws or regulations that prohibit vehicles from making a lane change at an early timing and continuously traveling on the passing lane (i.e., so-called "no passing zone violation"), and can also hinder vehicles traveling on the passing lane following the own vehicle.

Accordingly, it is desirable to achieve an automated driving assist apparatus that causes an own vehicle to make a lane change without making a driver experience a feeling of strangeness.

In the following example embodiment, the own vehicle is cause to make a lane change at an appropriate position backward from a congested region even though a lane regulation zone is set ahead of the own vehicle traveling on a traveling lane and a passing lane is congested with traffic due to the lane regulation.

A map information providing system illustrated in FIG. 1A may include a cloud server 1, traffic information centers 2, and a base station 4. In one embodiment, the cloud server 1 may serve as a "central controller". The cloud server 1, the traffic information centers 2, and the base station 4 may be coupled to one another through the Internet 5. The cloud server 1 may include a map database 1a that stores a global dynamic map (global DM) 6. The cloud server 1 may distribute information on the global DM 6 stored in the map database 1a (hereinafter referred to as "map information") to each vehicle via the base station 4. In FIG. 1A, an own vehicle M is illustrated as a representative example of the vehicle.

Each of the traffic information centers 2 may be under the jurisdiction of a private or public institution. Each of the traffic information centers 2 may collect traffic data and environment data that vary from hour to hour, and may transmit, to the cloud server 1, the collected information as traffic information. For example, a private traffic information center may collect probe traffic information from contracted vehicles and transmit the collected probe traffic information to the cloud server 1. The probe traffic information may include data on traffic jam or traffic congestion and data on the weather. For example, the data on traffic jam or traffic congestion may be generated on the basis of a vehicle speed, and the data on the weather may be determined on the basis of the frequency of use of a windshield wiper, for example. A public traffic information center may collect traffic information from various sensors installed on roads in advance, prefectural police departments, or road traffic administrators, for example, and transmits the collected traffic information to the cloud server 1, for example.

Figure 1B:
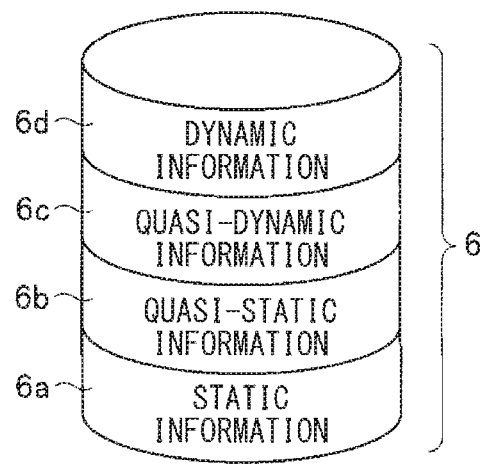
FIG. 1B is a diagram illustrating an example concept of a dynamic map according to one example embodiment of the technology.

The cloud server 1 may comprehensively control the traffic information by performing real-time processing of the traffic information received from the respective traffic information centers 2 in a time-series order, and sequentially updating the road traffic information stored in the global DM 6. With reference to FIG. 1B, the global DM 6 may have a four-layer structure, for example. The undermost layer may be a static information layer 6a that serves as a base layer. Additional map information necessary for supporting automatic traveling of the own vehicle M may be superimposed on the static information layer 6a.

The static information layer 6a serving as the undermost base information layer may store high-definition three-dimensional map information that includes data on road surfaces, lanes, intersections, three-dimensional structures, permanent regulation, and any other pieces of static information least likely to change. The additional map information superimposed on the static information layer 6a may be divided into three layers including a quasi-static information layer 6b, a quasi-dynamic information layer 6c, and a dynamic information layer 6d, in this order from the undermost layer.

These layers 6a to 6d may be divided depending on the degree of change or variation over time. The information in the layers 6a to 6d may be respectively updated every predetermined period of time in a sequential manner. For example, the static information layer 6a may include static information that is less likely to change than the information in the quasi-static information layer 6b, the quasi-dynamic information layer 6c, and the dynamic information layer 6d, and the static information may thus be updated every month or more frequently. The quasi-static information layer 6b may include quasi-static information on events that exhibit planned or predictable changes. In other words, the quasi-static information in the quasi-static information layer 6b may be more likely to change than the static information in the static information layer 6a, but less likely to change than the information in the quasi-dynamic information layer 6c and the dynamic information layer 6d. Specific but non-limiting examples of the quasi-static information stored in the quasi-static information layer 6b may include data on a schedule of lane regulation due to constructions, regulations in association with seasons and events, predicted traffic congestion, and weather in a wide area. The quasi-static information that is less likely to cause a dynamic change may be updated every hour or more frequently.

The quasi-dynamic information layer 6c may store quasi-dynamic information on events that are more likely to exhibit a dynamic change than the quasi-static information in the quasi-static information layer 6b. The quasi-dynamic information may include information on unplanned, unpredictable, or unexpected events. Specific but non-limiting examples of the quasi-dynamic information in the quasi-dynamic information layer 6c may include data on accidents, traffic congestion, and weather in a narrow area indicating weather events such as a torrential downpour. The quasi-dynamic information that is likely to exhibit a dynamic change may be updated every minute or more frequently.

The dynamic information layer 6d may store dynamic information that is most likely to change among the information in the layers 6a to 6d and thus needs to be updated in real time via an intervehicle communication, a road-to-vehicle communication, or a pedestrian-to-vehicle communication. Specific but non-limiting examples of the dynamic information in the dynamic information layer 6d may include data on signal indicators (e.g., colors of signals), crossing rail gates, vehicles traveling straight through an intersection, and pedestrians or bicycles traveling on an intersection. The dynamic information that needs to be acquired in real time may be updated every second or more frequently. Note that the above-described attributes of the information to the respective information layers 6a to 6d of the global DM 6 are non-limiting examples.

The information on the global DM 6 stored in the map database 1a of the cloud server 1 may be distributed from each of the base station 4 to each vehicle. The own vehicle M may be mounted with an automated driving assist apparatus 10 for automated driving. The automated driving assist apparatus 10 includes a camera unit 21 and a vehicle controller 23. The automated driving assist apparatus 10 may also include a map locator unit 11. In one embodiment, the camera unit 21 may serve as a "traveling-environment-information acquirer" or a "detector".

Figure 2:
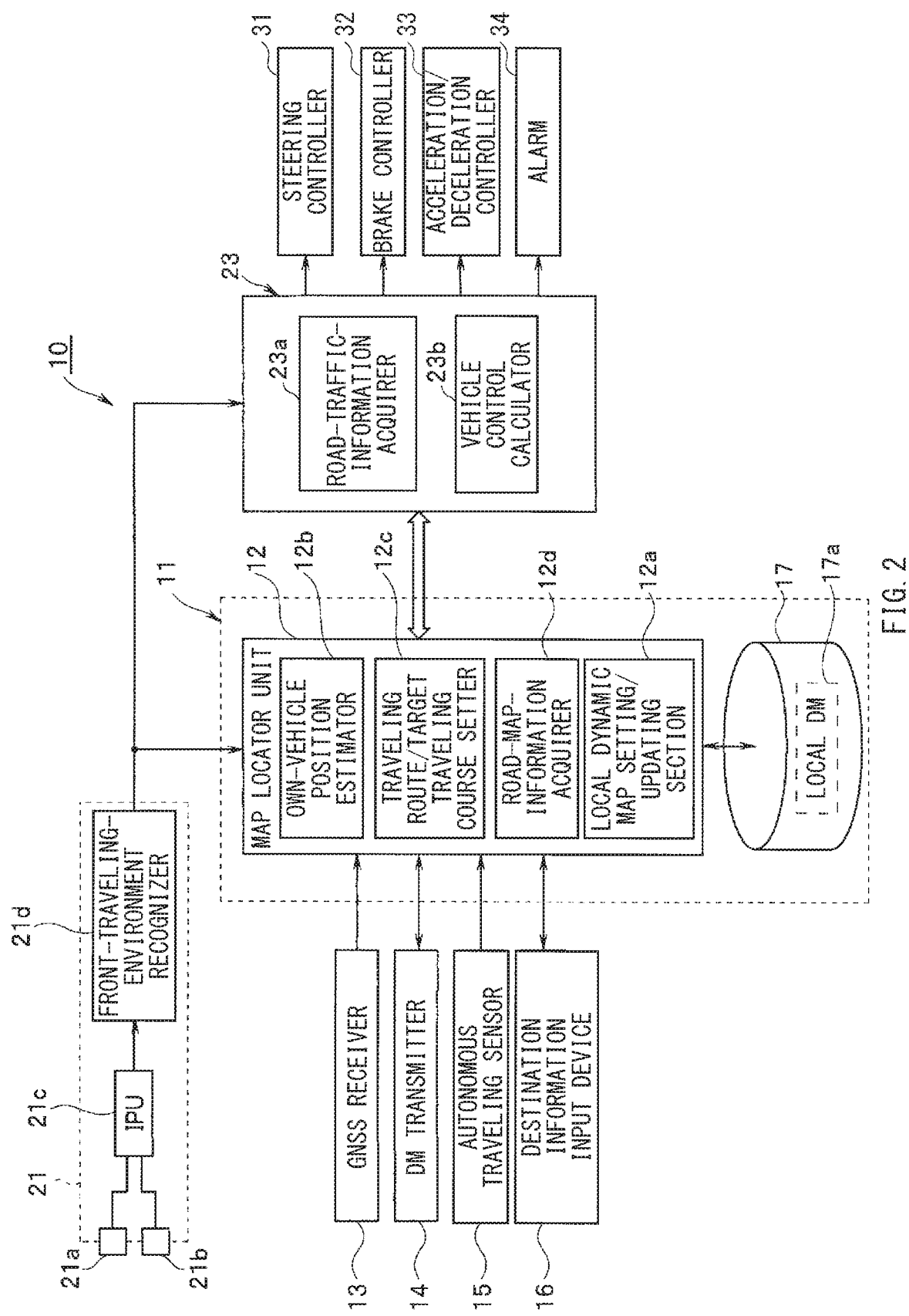
FIG. 2 is a diagram illustrating an outline configuration of an automated driving assist apparatus according to one example embodiment of the technology.

With reference to FIG. 2, the map locator unit 11 may include a map location calculator 12 and a map database 17. The map database 17 may be a stored in a mass storage medium, such as a hard disk drive (HDD). The map location calculator 12, a front-traveling-environment recognizer 21d described below, and a vehicle controller 23 may each include a known microcomputer that includes a central processing unit (CPU), a random access memory (RAM), and a read only memory (ROM), for example, and a peripheral device. The ROM may preliminarily store fixed data, such as a program to be executed by the CPU. The map database 17 may store a local dynamic map (local DM) 17a. The local DM 17a may be a dynamic map of a local region necessary for executing automatic traveling of the own vehicle M. The local DM 17a may have a layered structure similar to that of the global DM 6 illustrated in FIG. 1B.

The map location calculator 12 has an input that may be coupled to a global navigation satellite system (GNSS) receiver 13, a dynamic map (DM) transmitter 14, an autonomous traveling sensor 15, a destination information input device 16, and the front-traveling-environment recognizer 21d in the camera unit 21 described below.

The GNSS receiver 13 may receive positional signals from a plurality of positioning satellites. The DM transmitter 14 may request the cloud server 1 to transmit the map information stored in the global DM 6, and receive the map information transmitted from the cloud server 1.

The autonomous traveling sensor 15 may help achieve autonomous traveling of the own vehicle M in an environment, such as a region in a tunnel, where the own vehicle M has difficulty in receiving positional signals effectively from the GNSS satellites due to decreased sensitivity of the GNSS receiver 13. The autonomous traveling sensor 15 may include a vehicle speed sensor, a gyroscope sensor, and a forward/backward acceleration sensor, for example. The map location calculator 12 may determine a moving distance and an azimuth of the own vehicle M on the basis of a vehicle speed detected by the vehicle speed sensor, an angular speed detected by the gyroscope sensor, and a forward or backward acceleration rate detected by the forward/backward acceleration sensor. On the basis of the moving distance and the azimuth, the map location calculator 12 may perform localization of the position of the own vehicle M. The destination information input device 16 may be an external input device that receives, from an operator or a driver, a monitor input or an audio input that indicates destination information, such as an address, a telephone number, or the name of a facility, of the destination. In response to the input of the destination information, the map location calculator 12 may set a traveling route from a current position of the own vehicle M to the destination.

The map location calculator 12 may include a local dynamic map (DM) setting/updating section 12a, an own-vehicle position estimator 12b, a traveling route/target traveling course setter 12c, and a road-map-information acquirer 12d.

The local DM setting/updating section 12a may download the static information layer 6a of the global DM 6 stored in the map database 1a of the cloud server 1 at every predetermined cycle (for example, every month or more frequently), and update a static information layer of the local DM 17a in the map database 17 using the static information layer 6a. The traveling route from the current position of the own vehicle M to the destination that is to be used for the automated driving of the own vehicle M may be determined on the basis of the undermost base layer or the static information layer of the local DM 17a. Thus, the static information layer of the local DM 17a may be entirely updated using the static information layer 6a. In contrast, a quasi-static information layer, a quasi-dynamic information layer, and a dynamic information layer of the local DM 17a may only have to store dynamic information covering a local region along the target traveling course described in detail below. Therefore, part of the dynamic information covering a limited region around the position of the own vehicle M and the target traveling course may be downloaded from the quasi-static information layer 6b, the quasi-dynamic information layer 6c, and the dynamic information layer 6d.

The own-vehicle position estimator 12b may acquire positional information of the own vehicle M on the basis of positional signals received at the GNSS receiver 13. The positional information of the own vehicle M may indicate the positional coordinate (i.e., a latitude and a longitude) of the own vehicle M. While the own vehicle M is traveling on an environment where the own vehicle M has difficulty in receiving valid positional signals from the GNSS satellites due to decreased sensitivity of the GNSS receiver 13, the own-vehicle position estimator 12b may estimate the positional coordinate of the own vehicle M on the basis of signals from the autonomous traveling sensor 15.

The traveling route/target traveling course setter 12c may perform map matching of the positional coordinate (i.e., the latitude and the longitude) of the own vehicle M estimated by the own-vehicle position estimator 12b and the destination information received at the destination information input device 16, on the static information layer of the local DM 17a, to identify the position of the own vehicle M and the position of the destination. Thereafter, the traveling route/target traveling course setter 12c may create a traveling route connecting the position of the own vehicle M and the destination on the basis of the static information layer. Thereafter, the traveling route/target traveling course setter 12c may determine, on the traveling route, a target traveling course along which the own vehicle M on a traveling lane is to automatically travel. The target traveling course may extend in a predetermined distance ahead of the own vehicle M. For example, the predetermined distance may be in a range from several kilometers to several tens of kilometers from the position of the own vehicle M.

Thereafter, the traveling route/target traveling course setter 12c may request the local DM setting/updating section 12a to transmit map information on a particular region around the position of the own vehicle M and the target traveling course. In response to the request, the local DM setting/updating section 12a may access the cloud server 1 to download corresponding map information covering the particular region from the dynamic information (i.e., the quasi-static information layer 6b, the quasi-dynamic information layer 6c, and the dynamic information layer 6d) in the global DM 6. The traveling route/target traveling course setter 12c may sequentially update the information layers of the local DM 17a using the downloaded information.

The road-map-information acquirer 12d may combine the static information layer that is stored in the local DM 17a and covers the particular region around the position of the own vehicle M and the target traveling course with the quasi-static information layer 6b, the quasi-dynamic information layer 6c, the dynamic information layer 6d to construct a dynamic map covering the particular region around the position of the own vehicle M and the target traveling course.

The camera unit 21 may be fixed on an upper central portion of a front interior side of the own vehicle M. The camera unit 21 may include a vehicle-mounted camera, an image processor (IPU) 21c, and a front-traveling-environment recognizer 21d. The vehicle-mounted camera may be a stereo camera that includes a main camera 21a and a subsidiary camera 21b disposed at respective positions bilaterally symmetric to each other about a line extending through a middle of the width of the own vehicle M. The camera unit 21 may cause the main camera 21a and the subsidiary camera 21b to capture an image of an environment (i.e., acquire traveling-environment image data) in front of the own vehicle M, and cause the IPU 21c to perform a predetermined image process on the traveling-environment image data.

The front-traveling-environment recognizer 21d may read the traveling-environment image data subjected to the image processing at the IPU 21c to acquire front-traveling-environment information on the basis of the traveling-environment image data. The front-traveling-environment information may include data on a road feature of the traveling course of the own vehicle M (hereinafter also referred to as an "own-vehicle traveling course"). Specific but non-limiting examples of the data on road feature of the own-vehicle traveling course may include data on a road curvature of a middle of a lane at which a lane line dividing the lane into right and left lanes extends, data on the widths of the right and left lanes divided by the lane line (i.e., lane widths), intersections, colors of signals indicated by traffic lights, road signs, obstacles, such as utility poles, guardrails, walls, or vehicles stopping on a side of the road.

The local DM setting/updating section 12a may read the front-traveling-environment information acquired by the front-traveling-environment recognizer 21d to update the dynamic map information stored in the local DM 17a (i.e., the quasi-static information layer, the quasi-dynamic information layer, the dynamic information layer) in the map database 17 in real time. The dynamic map that covers the region around the position of the own vehicle M and the target traveling course and is read by the road-map-information acquirer 12d may thus be sequentially updated also with the information acquired by the front-traveling-environment recognizer 21d of the camera unit 21 (e.g., information indicating that the lane regulation has been already released, information indicating that the traffic congestion due to the lane regulation has been relieved, or information indicating that the tail end of the traffic queue of vehicles is positioned adjacent to the own vehicle M). This allows for constant acquisition of the latest road map information.

The vehicle controller 23 may include a road-traffic-information acquirer 23a and a vehicle control calculator 23b. In one embodiment, the road-traffic-information acquirer 23a and the vehicle control calculator 23b may together serve as a "traffic information acquirer". The vehicle controller 23 has an input that may be coupled to the front-traveling-environment recognizer 21d of the camera unit 21. The vehicle controller 23 has an output that may be coupled to a steering controller 31, a brake controller 32, an acceleration/deceleration controller 33, and an alarm 34. The steering controller 31 may cause the own vehicle M to travel along the target traveling course. The brake controller 32 may decelerate the own vehicle M by forcible braking. The acceleration/deceleration controller 33 may control a vehicle speed of the own vehicle M. The vehicle controller 23 and the map location calculator 12 may be coupled to each other via an in-vehicle communication line, such as a controller area network (CAN), to establish a bidirectional communication between the vehicle controller 23 and the map location calculator 12.

The road-traffic-information acquirer 23a may retrieve road traffic information from the dynamic map covering the region around the target traveling course (i.e., the local dynamic map) and constructed by the road-map-information acquirer 12d. Specific but non-limiting examples of the road traffic information may include data on vehicles traveling around the own vehicle M, an intersection in front of the own vehicle M, colors of signals indicated by traffic lights, road signs, obstacles on a side of the road, the position of a lane regulation zone generated by road constructions or accidents, for example, and traffic congestion due to the lane regulation.

The vehicle control calculator 23b may perform a predetermined control of the steering controller 31, the brake controller 32, and the acceleration/deceleration controller 33 that causes the own vehicle M to automatically travel along the target traveling course. For the automated traveling of the own vehicle M, the vehicle control calculator 23b may perform a known adaptive cruise control (ACC) and a known active lane keep (ALK) control on the basis of the local dynamic map covering the region around the target traveling course and constructed by the road-map-information acquirer 12d and the front-traveling-environment information acquired by the front environment recognizer 21d. When detecting a preceding vehicle, the vehicle control calculator 23b may cause the own vehicle M to travel following the preceding vehicle. When detecting no preceding vehicle, the vehicle control calculator 23b may cause the own vehicle M to travel at a set vehicle speed. Note that the set vehicle speed may be a speed limited at the highest.

In a case where traffic regulation is set on the target traveling course along which the own vehicle M on a traveling lane is to automatically travel and where traffic congestion is generated on a traveling zone by the traffic regulation, the vehicle control calculator 23b may calculate, on the basis of the road traffic information covering the region around the own vehicle M and the target traveling course and acquired by the road-traffic-information acquirer 23a, a timing at which the own vehicle M is to make a lane change. For example, according to the traffic laws for the left-hand side driving, the rightmost traveling lane is identified as a passing lane, and vehicles are obligated to travel on a traveling lane other than the passing lane in normal situations. Accordingly, making a lane change at an early timing after detection of the lane regulation and continuously traveling on the passing lane can be an action so-called "no passing zone violation". Therefore, while automatically traveling in a situation where traffic congestion is generated by the lane regulation, the own vehicle M needs to make a lane change to the passing lane at an appropriate timing in compliance with the traffic laws.

Figure 3:
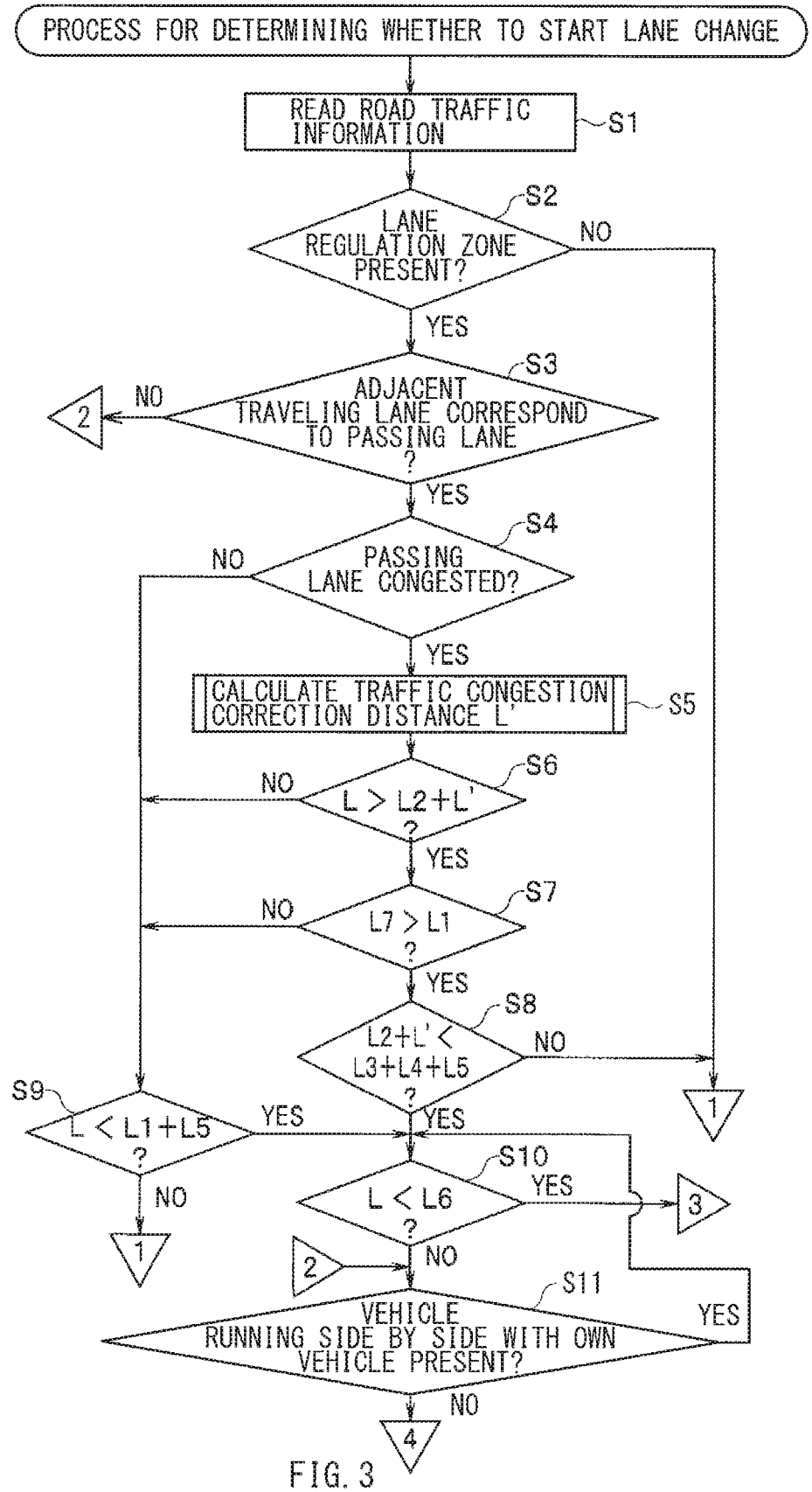
FIG. 3 is a flowchart illustrating an example routine for determining whether to start a lane change.
Figure 4:
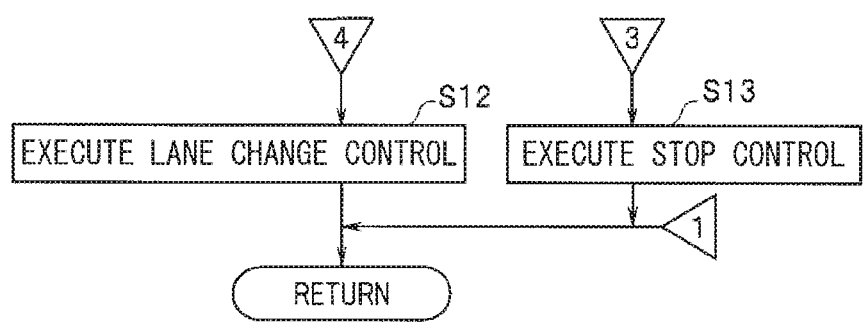
FIG. 4 is a flowchart illustrating an example routine subsequent to the routine illustrated in FIG. 1, for determining whether to start a lane change.

In one embodiment, the vehicle control calculator 23b may serve as a "traffic congestion determiner", a "distance comparator", a "lane-change start determiner", and a "lane-change controller". For example, the vehicle control calculator 23b may determine the start timing of the lane change following an example routine illustrated in FIG. 3. Note that the following description is made for an example road on which vehicles are obligated to travel on the left-hand side. Accordingly, when the following description is applied to a road on which vehicle are obligated to travel on the right-hand side, the right side and the left side in the following description are read in reversed.

In the example routine, the vehicle control calculator 23b may first read the road traffic information acquired by the road-traffic-information acquirer 23a and covering the region around the position of the own vehicle M and the target traveling course in Step S1. Thereafter, in Step S2, the vehicle control calculator 23b may determine, on the basis of the road traffic information, whether a lane regulation zone is set on the target traveling course in front of the own vehicle M. In a case where the lane regulation zone is set (YES in Step S2), the procedure may proceed to Step S3. In a case where the lane regulation zone is not set (NO in Step S2), the procedure may exit the routine, and the vehicle control calculator 23b may cause the own vehicle M to keep automatically traveling along the target traveling course.

In Step S3, the vehicle control calculator 23b may determine, on the basis of the road traffic information described above, whether a traveling lane adjacent to the target traveling course along which the own vehicle M is traveling corresponds to a passing lane. In an example where the traveling zone is divided into three or more lanes and where the own vehicle is traveling on the leftmost lane, only the rightmost lane corresponds to the passing lane. In this example, a lane change of the own vehicle M from the leftmost lane to an adjacent lane at a position far backward from the lane regulation zone on the leftmost lane is not an action against the traffic laws. Accordingly, in a case where the adjacent lane does not correspond to the passing lane (NO in Step S3), the procedure may jump to Step S11. In Step S11, the vehicle control calculator 23b may cause the own vehicle M to start making a lane change at an early timing.

In contrast, in a case where the adjacent lane corresponds to the passing lane (YES in Step S3), the procedure may proceed to Step S4. In Step S4, the vehicle control calculator 23b may determine, on the basis of the road traffic information covering the region around the target traveling course in front of the own vehicle M, whether traffic congestion is generated on the passing lane adjacent to the target traveling course. Note that the vehicle control calculator 23b that performs the processes in Steps S3 and S4 may serve as the traffic-congestion determiner.

In a case where the vehicle control calculator 23b determines that the traffic congestion is generated on the passing lane (YES in Step S4), the procedure may proceed to Step S5. In contrast, in a case where the vehicle control calculator 23b determines that the traffic congestion is not generated on the passing lane (NO in Step S4), the procedure may jump to Step S9. Herein, the term "traffic congestion" may refer to a condition in which vehicles are traveling at a predetermined low speed per hour (for example, 40 kilometers per hour or lower on an express way) or a condition in which a traffic queue of vehicles extending in a predetermined distance (for example, one kilometer) or longer repeats stopping and advancing for a predetermined time (for example, 15 minutes) or longer. Note that these conditions are non-limiting examples.

Making a lane change to the passing lane at an early timing after the detection of the traffic congestion and continuously traveling on the passing lane for a long time can be an action against the traffic laws or a so-called "no passing zone violation" and can also inhibit traveling of a vehicle following the own vehicle M on the passing lane. Accordingly, in Steps S5 to S9, the vehicle control calculator 23b may determine an appropriate timing of the lane change to the passing lane after the detection of the traffic congestion.

Figure 5:
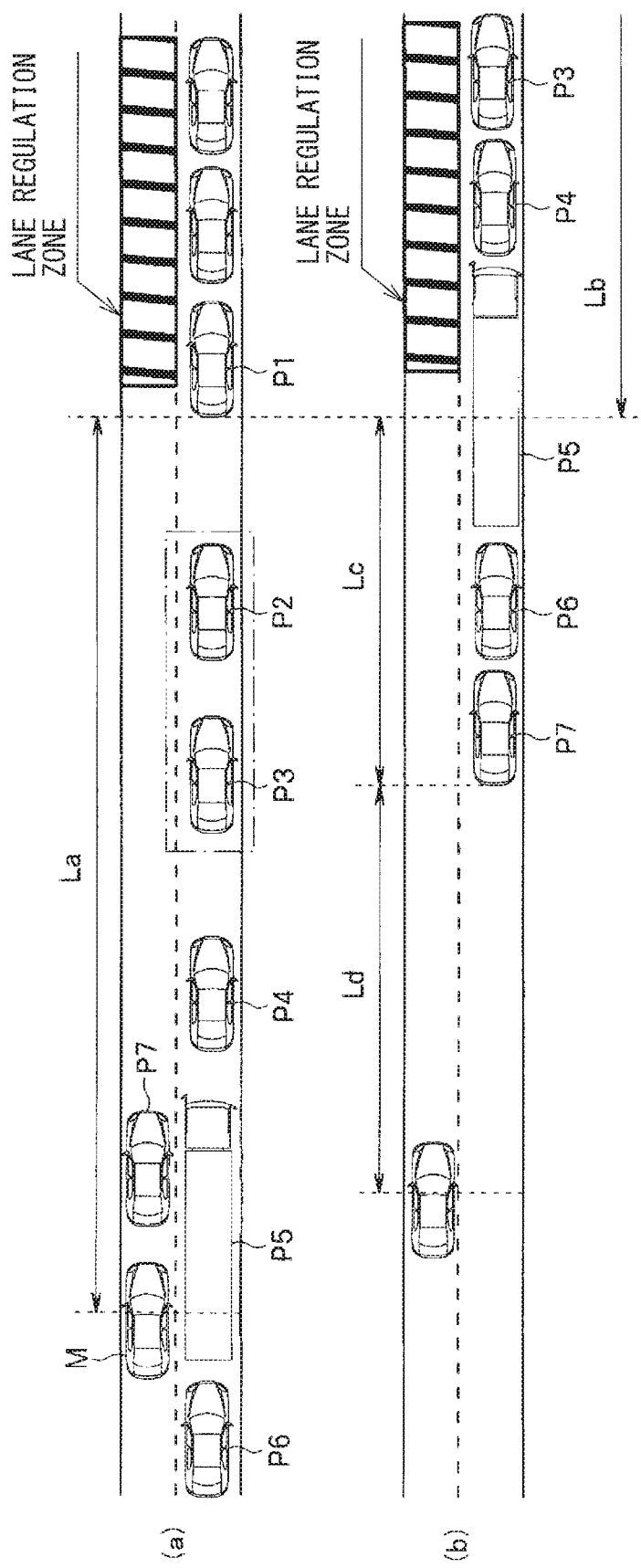
FIG. 5 is a bird's-eye view of a road on which an own vehicle is traveling, in which (a) of FIG. 5 illustrates an example situation where a passing lane adjacent to a lane regulation zone is congested, and (b) of FIG. 5 illustrates an example situation of the road after an elapse of a predetermined period of time from the situation illustrated in (a) of FIG. 5.

With reference to (a) of FIG. 5, for example, the vehicle control calculator 23b may calculate a distance La from the own vehicle M to a vehicle P1 at the tail end of the traffic queue of vehicles on the basis of the road traffic information and the position of the own vehicle M. The distance La from the own vehicle M to the vehicle P1 at the tail end of the traffic queue of vehicles may be hereinafter referred to as a "distance La to traffic congestion". It should be noted that a time lag is inevitably generated between the detection of the traffic congestion information from the cloud server 1 and the reception or acquisition of the traffic congestion information by the own vehicle M.

Such a time lag can cause an inconvenience as follows. In an example situation where vehicles (e.g., P2 to P6 in (a) of FIG. 5) come closer to the vehicle P1 at the tail end of the traffic queue of vehicles, the own vehicle M is hindered from making a lane change despite the timing of the lane change has been determined on the basis of the distance La to traffic congestion. In this case, the own vehicle M may have to be decelerated or stopped to interrupt the traffic queue of vehicles. However, automated control of such an interruption is highly difficult to achieve. In a case where a preceding vehicle P7 is traveling ahead of the own vehicle M in the same situation described above, the preceding vehicle P7 may have to interrupt the traffic queue of vehicles before the own vehicle M interrupts the traffic queue. This makes the automatic control of the interruption of the own vehicle M more difficult.

To address these example concerns, in the example embodiment, the vehicle control calculator 23b may determine the timing of the lane change by acquiring vehicles traveling ahead of the own vehicle M as illustrated in (b) of FIG. 5. In an example situation where the traffic queue of vehicles is traveling at a low speed, the vehicle P1 at the tail end of the queue may move by a predetermined moving distance Lb in a predetermined time. In other words, the distance La to traffic congestion may vary depending on a difference between the vehicle speed of the own vehicle M (hereinafter also referred to as an "own vehicle speed") and a moving speed of the traffic queue of vehicles. Additionally, in a case where a plurality of vehicles (e.g., vehicle P2 to a vehicle P7 in (b) of FIG. 5, illustration of the vehicle P2 is omitted) are present between the own vehicle M and the vehicle P1 at the tail end of the queue, the vehicles P2 to P7 are added to the traffic queue, and the length of the traffic queue becomes longer by a distance Lc (hereinafter referred to as a "vehicle increment distance Lc") than the length of the traffic queue illustrated in (a) of FIG. 5. Thus, the vehicle control calculator 23b may calculate an actual distance Ld to traffic congestion on the basis of a relation of the difference between the own vehicle speed and the moving speed of the traffic queue with respect to the queue of the additional vehicles.

In Step S5, the vehicle control calculator 23b may determine a traffic congestion correction distance L' to correct a shift in the distance between the tail end of the traffic queue and the own vehicle M due to the time lag between the detection of the traffic congestion information from the cloud server 1 and the reception or acquisition of the traffic congestion information by the own vehicle M.

The vehicle control calculator 23b may determine the traffic congestion correction distance L' by adding the moving distance Lb to the vehicle increment distance Lc (i.e., L'=Lb+Lc). As described above, the moving distance Lb represents a moving distance of the vehicle P1 at the tail end of the traffic queue (i.e., a moving distance of the traffic queue of vehicles), and the vehicle increment distance Lc represents an increment in the length of the traffic queue generated by the time lag. The moving distance Lb may be calculated by the following expression:

$Lb$=moving speed of traffic queue×elapsed time from detection of traffic congestion information      Expression 1, where the elapsed time represents a time lag between the detection of the latest information from the cloud server 1 and the start of this calculation.

Provided that the number of the vehicles present between the own vehicle M and the tail end of the traffic queue is accurately detected after the own vehicle M makes a lane change, the vehicle increment distance Lc may be readily calculated by the following expression:

number of vehicles×(entire length of vehicle+intervehicle distance)      Expression 2.

However, in some cases, an undetected group of vehicles (e.g., vehicles P2 and P3 surrounded by a dot-and-dash line in (a) of FIG. 5) may be present in the traffic queue of the vehicles. In such a case, the vehicle increment distance Lc used in Expression 1 may be shorter than an actual vehicle increment distance. This may hinder the own vehicle M from making a lane change at an appropriate timing, as illustrated in (a) of FIG. 5.

To address such an example concern, in the example embodiment, the vehicle control calculator 23b may calculate the vehicle increment distance Lc on the presumption that an undetected group of vehicles is present between the own vehicle having changed lanes and the tail end of the traffic queue. This allows for an appropriate determination of an appropriate timing of the lane change. For example, the vehicle increment distance Lc may be calculated by the following expression:

$Lc$={α+number of vehicles added to traffic queue after acquisition of traffic congestion information}×(entire length of each vehicle+intervehicle distance)      Expression 3, where the entire length of each vehicle is a constant value. Alternatively, the entire length of each vehicle may be determined individually in a case where the entire length of each vehicle may be individually retrieved from the road traffic information or the image captured by the camera unit 21.

In Expression 3, denotes an estimated number of undetected vehicles. The estimated number α of undetected vehicles may be calculated by the following expression:

α=[ρ$t$/{(number of lanes−number of lanes under construction)/number of lanes}]×distance from the own vehicle to the tail end of the traffic queue      Expression 4, where ρt denotes a traffic density of the entire road backward from the traffic congestion. The traffic density ρt may be calculated by the following expression:

ρt=number of vehicles present between own vehicle and tail end of traffic queue after acquisition of traffic congestion information/traveling distance of the own vehicle M after the acquisition of the traffic congestion information    Expression 5, where the traveling distance is a value calculated on the basis of the own vehicle speed and the elapsed time from the acquisition of the traffic congestion information.

The number of vehicles may vary at every calculation cycle since the own vehicle M traveling toward the traffic queue overtakes a preceding vehicle or is overtaken by a following vehicle. In one example, such an increase or decrease in the number of vehicles may be retrieved from the road traffic information. In another example, the increase or decrease in the number of vehicles may be determined by counting the number of vehicles recognized using the camera unit 21. In an example case where the moving speed of the traffic queue is 5.5 meters per second, the elapsed time after the acquisition of the traffic congested information is 60 seconds, the distance from the own vehicle to the tail end of the traffic queue is 3000 meters, the number of vehicles is 10, the traveling distance of the own vehicle M after the acquisition of the traffic congestion information is 2000 meters, the number of lanes is 2, the number of lanes under construction is 1, the entire length of each vehicle is 6 meters, and the intervehicle distance is 3 meters (which varies depending on a vehicle speed), the moving distance Lb of the traffic queue may be calculated by the expression 5.5×60, and thus determined to be −330 meters.

Additionally, the estimated number α of undetected vehicles may be calculated by the expression α=[(10/2000)/{(2−1)/2}]×3000, and may thus be determined to be 30. The vehicle increment distance Lc may be calculated by the expression Lc=(30+10)×(6+3) and thus determined to be 360 meters.

The traffic congestion correction distance L', therefore, may be calculated by the expression L'=−330+360, and thus determined to be 30 meters.

Thereafter, in Step S6, the vehicle control calculator 23b may determine a distance L from a starting position of the lane regulation zone to a position of the own vehicle M (hereinafter referred to as a "distance L to the lane regulation zone") and a distance L2 from the position of the own vehicle M to the tail end of the traffic queue (hereinafter referred to as a "distance L2 to the traffic queue") on the basis of the road traffic information. The vehicle control calculator 23b may compare the distance L to the lane regulation zone with an estimated distance (L2+L') to the traffic queue. The estimated distance (L2+L') to the traffic queue may be the sum of traffic congestion correction distance L' and the distance L2 to the traffic queue.

Figure 7:
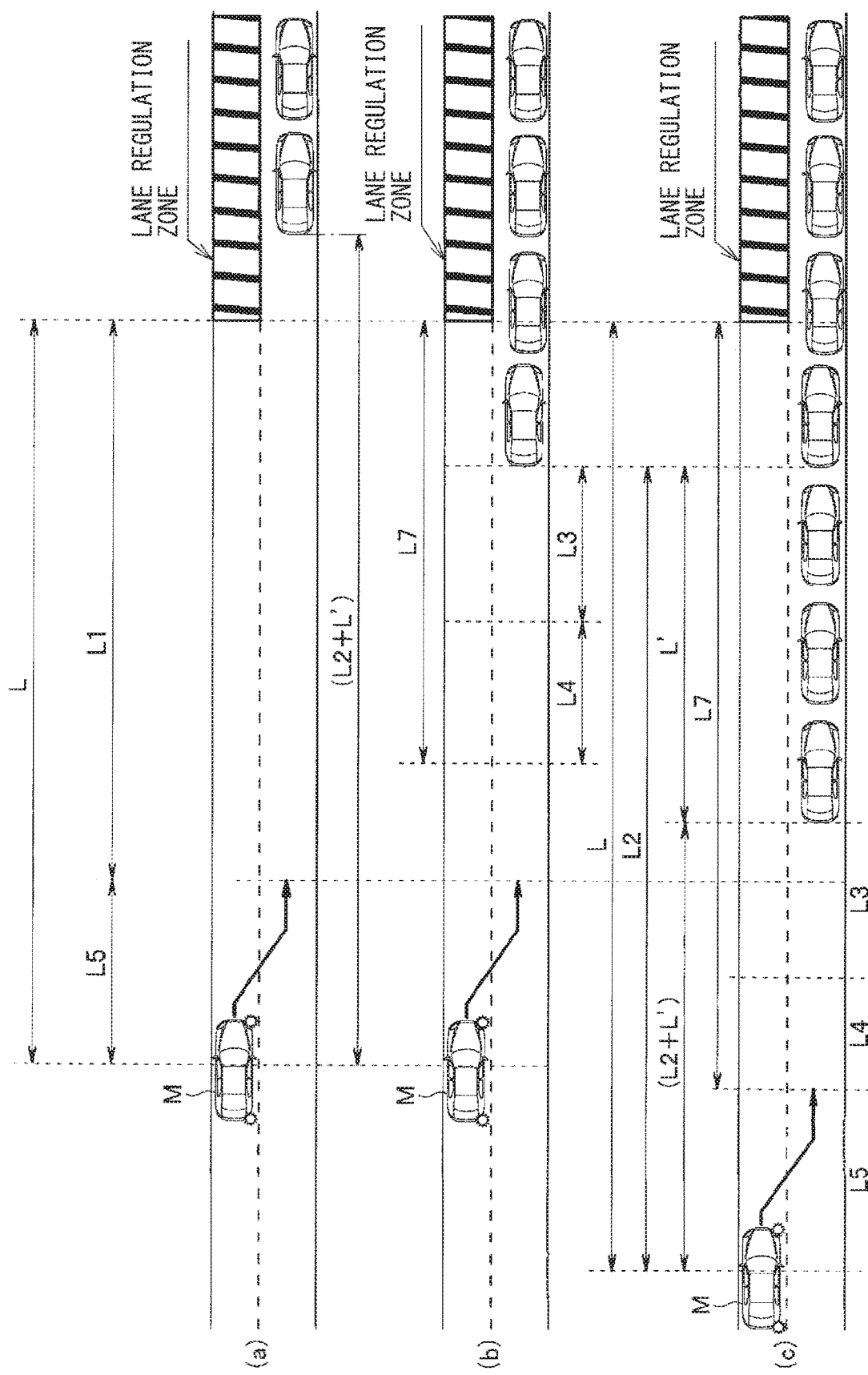
FIG. 7 is a diagram for explaining a lane change to a passing lane that is congested, in which (a) of FIG. 7 is a bird's-eye view of an example road on which the own vehicle is trying to make a lane change in a condition where the tail end of a traffic queue of vehicles on the passing lane is positioned forward from a start position of the lane regulation zone, (b) of FIG. 7 is a bird's-eye view illustrating an example road on which the own vehicle is trying to make a lane change in a condition where the tail end of the traffic queue of vehicles on the passing lane is positioned backward from the starting position of the lane regulation zone, and (c) of FIG. 7 is a bird's-eye view of an example road on which the own vehicle is trying to make a lane change in a condition where the tail end of the traffic queue of vehicles on the passing lane comes closer to the own vehicle than in (b) of FIG. 7.

In a case where the distance L to the lane regulation zone is not greater than the estimated distance (L2+L') to the traffic queue (i.e., L≤L2+L') (NO in Step S6), the vehicle control calculator 23b may determine that the tail end of the traffic queue is positioned backward from the starting position of the lane regulation zone as illustrated in (a) of FIG. 7, and the procedure may jump to Step S9. In contrast, in a case where the distance L to the lane regulation zone is greater than the estimated distance (L2+L') to the traffic queue (i.e., L>L2+L') (YES in Step S6), the vehicle control calculator 23b may determine that the tail end of the traffic queue is positioned backward from the starting position of the lane regulation zone as illustrated in (c) of FIG. 7, and the procedure may proceed to Step S7.

In Step S7, the vehicle control calculator 23b may compare a lane-change permission distance L1 with a lane-change available distance L7. The lane-change permission distance L1 may extend from the starting position of the lane regulation zone to a position which is located backward from the starting position of the lane regulation zone and at which the own vehicle M is permitted to start making a lane change. The lane-change permission distance L1 may be a distance in which the own vehicle M is permitted to make a lane change from a position backward from the lane regulation zone to the passing lane in compliance with the traffic laws. The lane-change permission distance L1 may be a fixed value that is preset, and may be two kilometers, for example.

The lane-change available distance L7 may be a distance necessary for the own vehicle M having changed lanes to safely travel following a vehicle at the tail end of the traffic queue. The lane-change available distance L7 may be determined on the basis of the starting position of the lane regulation zone. The lane-change available distance L7 may be calculated by the following expression:

$$L7=L-(L2+L')+L3+L4$$

where L3 denotes a brake control distance to be kept between the own vehicle M and the vehicle at the tail end of the traffic queue for safe stopping of the own vehicle M, L4 denotes an interruption distance necessary for the own vehicle M to complete the lane change from the current lane to the adjacent passing lane before entering the brake control distance L3. The sum of the brake control distance L3 and the interruption distance L4 (i.e., L3+L4) may thus be an intervehicle distance to be kept between the own vehicle M having changed lanes and the vehicle at the tail end of the traffic queue. Note that the brake control distance L3 and the interruption distance L4 may be each a fixed value in one example embodiment. In another example embodiment, the brake control distance L3 and the interruption distance L4 may be each a value variable determined depending on the own vehicle speed.

In a case where the lane-change available distance L7 is not greater than the lane-change permission distance L1 (i.e., L7≤L1) (NO in Step S7), the vehicle control calculator 23b may determine that there is plenty of time until an appropriate timing of the lane change of the own vehicle M, as illustrated in (b) of FIG. 7, and the procedure may branch to Step S9. In contrast, in a case where the lane-change available distance L7 is greater than the lane-change permission distance L1 (i.e., L7>L1) (YES in Step S7), the vehicle control calculator 23b may determine that the own vehicle M needs to make a lane change before entering the lane-change permission distance L1, as illustrated in (c) of FIG. 7, and the procedure may proceed to Step S8. Note that the vehicle control calculator 23b that performs the processes in Steps S6 and S7 may serve as the "distance comparator".

In Step S8, the vehicle control calculator 23b may compare the estimated distance (L2+L') to the traffic queue with a lane-change start distance. The lane-change start distance may be the sum of the brake control distance L3, the interruption distance L4, and a lane change distance L5 (i.e., L3+L4+L5). The lane change distance L5 may be a distance necessary for the own vehicle M to make the lane change from the current traveling lane to the passing lane. The lane change distance L5 may be determined on the basis of the vehicle speed.

In a case where the estimated distance (L2+L') to the traffic queue is not less than the lane-change start distance (L3+L4+L5) (i.e., (L2+L')≥(L3+L4+L5)), the vehicle control calculator 23b may determine that the estimated distance (L2+L') to the traffic queue does not reach the lane-change start distance (L3+L4+L5) and that the own vehicle M does not need to make a lane change ("NO" in Step S8), and the procedure may exit the routine. When the estimated distance (L2+L') to the traffic queue reaches the lane-change start distance (L3+L4+L5) (i.e., (L2+L')<(L3+L4+L5)), the vehicle control calculator 23b may determine that the own vehicle M needs to start a lane change ("YES" in Step S8), and the procedure may proceed to Step S10.

In Step S9, the vehicle control calculator 23b may compare the distance L to the lane regulation zone with the sum of the lane-change permission distance L1 and the lane change distance L5. Note that the sum of the lane-change permission distance L1 and the lane change distance L5 may correspond to a lane-change start distance in a condition where traffic congestion is not generated.

In a case where the distance L to the lane regulation zone is not less than the lane-change start distance L1+L5 (i.e., L≥L1+L5), the vehicle control calculator 23b may determine that the own vehicle M does not need to start a lane change yet ("NO" in Step S9), and the procedure may exit the routine. In a case where the distance L to the lane regulation zone is less than the lane-change start distance L1+L5 (i.e., L<L1+L5), the vehicle control calculator 23b may determine that the own vehicle M needs to start a lane change ("YES" in Step S10), and the procedure may proceed to Step S10. Accordingly, in an example situation illustrated in (a) of FIG. 6 where no preceding vehicle is present on the passing lane ahead of the own vehicle M, the own vehicle M may start the lane change when the distance L to the lane regulation zone reaches the lane-change start distance (L1+L5). Note that the vehicle control calculator 23b that performs the processes in Steps S8 and S9 may serve as the "lane-change start determiner".

In Step S10, the vehicle control calculator 23b may compare the distance L to the lane regulation zone with a braking start distance L6. The braking start distance L6 may be a distance in which brake control is to be started to safely stop the own vehicle M at a position backward from the lane regulation zone. The braking start distance L6 may be a fixed value that is preset. In a case where the distance L to the lane regulation zone is not less than the braking start distance L6 (i.e., L≥L6), the vehicle control calculator 23b may determine that the own vehicle M has not reached the braking start distance L6 ("NO" in Step S10), and the procedure may proceed to Step S11. In a case where the distance L to the lane regulation zone is less than the braking start distance (i.e., L<L6), the vehicle control calculator 23b may determine to start the brake control ("YES" in Step S10), and the procedure may jump to Step S13.

In Step S11, the vehicle control calculator 23b may determine whether a vehicle running side by side with the own vehicle M is present on the passing lane. The presence of the vehicle running side by side with the own vehicle M may be determined on the basis of the road traffic information read in Step S1 or the information acquired with the camera unit 21. In a case where the vehicle running side by side with the own vehicle M is detected ("YES" in Step S11), the procedure may return to Step S10. In contrast, in a case where the vehicle running side by side with the own vehicle M is not detected ("NO" in Step S11), the procedure may proceed to Step S12.

Figure 6:
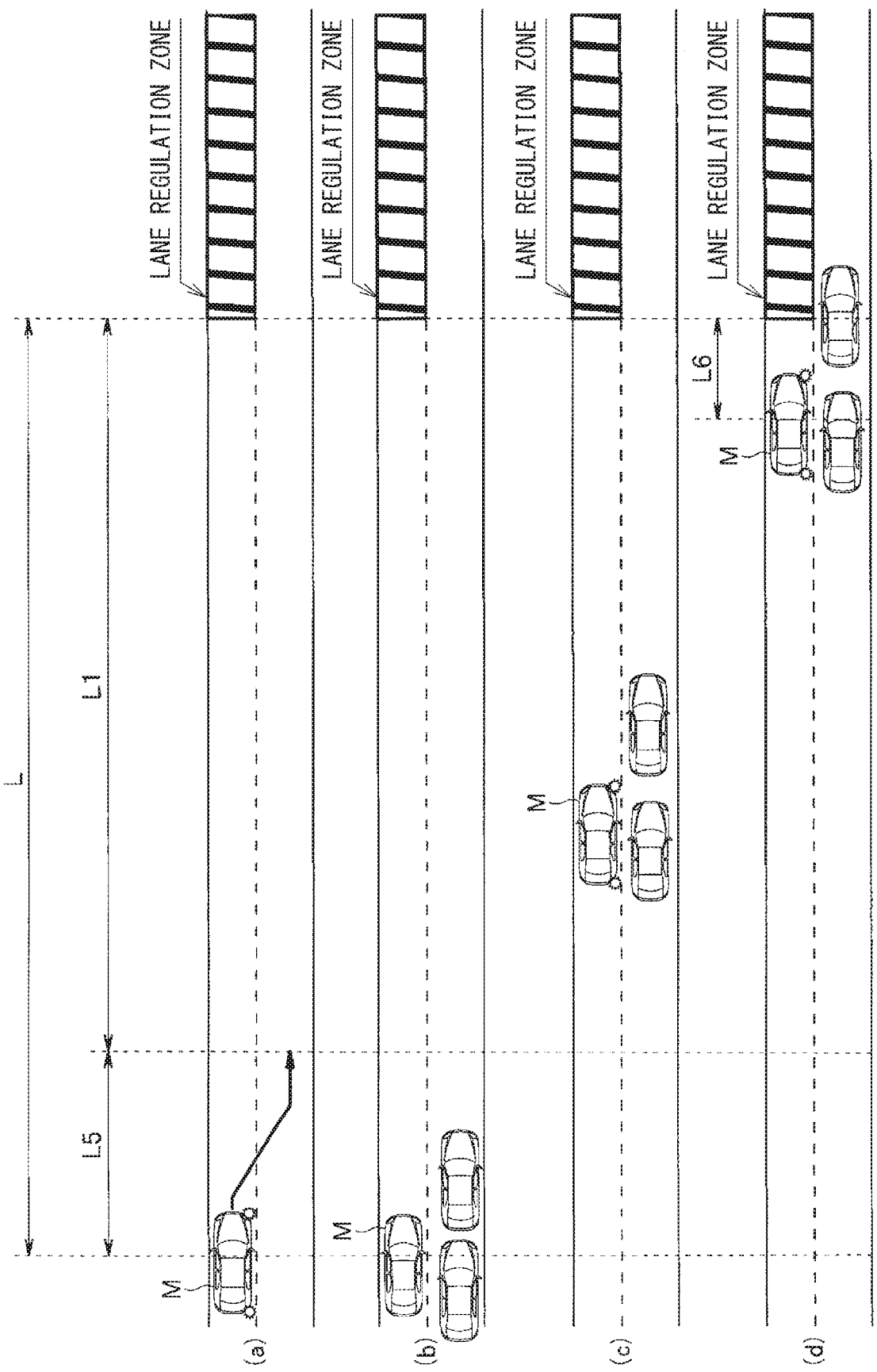
FIG. 6 is a diagram for explaining a lane change to a passing lane that is not congested, in which (a) of FIG. 6 is a bird's-eye view of an example road on which the own vehicle is trying to make a lane change at a lane change position set on a traveling course of the own vehicle, (b) of FIG. 6 is a bird's-eye view of an example road on which the own vehicle is traveling side by side with other vehicles on the passing lane at the lane change position illustrated in (a) of FIG. 6, (c) of FIG. 6 is a bird's-eye view of an example road on which the own vehicle reaches an interruption start position and is still traveling side by side with the other vehicles on the passing lane as in illustrated in (b) of FIG. 6, and (d) of FIG. 6 is a bird's-eye view of an example road on which the own vehicle reaches a stop position and is still traveling side by side with the other vehicles as in illustrated in (c) of FIG. 6.

For example, in an example situation illustrated in (b) of FIG. 6 and (c) of FIG. 6, the own vehicle M having reached a position to start making a lane change may be hindered from making a lane change by vehicles running side by side with the own vehicle on the passing lane and forced to keep traveling on the current traveling lane side by side with the vehicles traveling on the passing lane. When the own vehicle M having failed to make the lane change enters the braking start distance L6 as illustrated in (d) of FIG. 6, the procedure may branch to Step S13. In an example situation illustrated in (c) of FIG. 6 where the own vehicle M is traveling at a position located forward by a predetermined distance from the position at which the lane change is to start and where the vehicles on the passing lane are keeping running side by side with the own vehicle M, the own vehicle M may be decelerated to secure the brake control distance L3 and the interruption distance L4 behind the vehicles running side by side with the own vehicle M, and the procedure may proceed to Step S12.

In Step S12, the vehicle control calculator 23b may execute the lane change control, and the procedure may exit the routine. For example, the vehicle control calculator 23b may transmit, to each of the controllers 31 to 33, a control signal that causes the own vehicle M to make a lane change to the passing lane to thereby execute the lane change. In one embodiment, the vehicle control calculator 23b that performs the process in Step S12 may serve as the "lane-change controller".

In Step S13, the vehicle control calculator 23b may cause the own vehicle M to stop, and the procedure may exit the routine. For example, the vehicle control calculator 23b may cause the brake controller 32 to stop the own vehicle M at a position backward from the start position of the lane regulation zone. After stopping the own vehicle M, the vehicle control calculator 23b may terminate the automated driving and make the driver to take over the driving operation.

According to any of the foregoing example embodiments described above, in a situation where the lane regulation zone is set ahead of the own vehicle M traveling on the traveling lane and where the own vehicle M is trying to make a lane change toward the passing lane, the moving speed of the traffic queue, the number of vehicles following the traffic queue, and an estimated number of undetected vehicles may be determined to calculate the distance between the own vehicle M and the tail end of the traffic queue. This allows the own vehicle M to make a lane change at an appropriate position backward from a region congested with vehicles. Accordingly, it is possible to achieve automated driving that causes the own vehicle M to make a lane change without making the driver experience a feeling of strangeness.

According to any of the example embodiment of the technology, in a case where traffic congestion is generated on the passing lane adjacent to the lane regulation zone, the distance from the own vehicle to the start position of the lane regulation zone, and the estimated distance from the own vehicle to the tail end of the traffic queue are calculated on the basis of the road traffic information acquired by the traffic information acquirer. When it is determined that the distance to the lane regulation zone is greater than the estimated distance to the traffic queue, whether the estimated distance to the traffic queue reaches the preset lane-change start distance to the tail end of the traffic queue. When it is determined that the estimated distance to the traffic queue reaches the lane line start distance, the own vehicle M is caused to make a lane change. Accordingly, even though traffic congestion is generated on the passing lane due to lane regulation, it is possible to cause the own vehicle to make a lane change at an appropriated position backward from the congested region without making the driver experience a feeling of strangeness.

Furthermore, according to any of the foregoing example embodiments, a lane change of the own vehicle M at an appropriate timing is achieved without causing the own vehicle M to make a lane change at an early timing even though traffic congestion is detected on the passing lane. This allows the own vehicle M to travel in compliance with the traffic laws without causing the own vehicle M to travel on the passing lane for a long time against the traffic laws, and prevents the own vehicle M from hindering vehicles traveling on the passing lane following the own vehicle M.

It should be understood that the technology is not limited to the example embodiments described above. For example, when it is determined, in Step S3 described above, that a lane adjacent to the lane on which the own vehicle M is traveling is not a passing lane, the procedure may exit the routine, and a timing at which the own vehicle M makes a lane change to the adjacent lane may be determined in another procedure.

Additionally, the information acquired by the front environment recognizer 21d may be probe traffic information to be transmitted to the cloud server 1.

Although some embodiments of the technology are described hereinabove, the foregoing embodiments are merely examples and are not intended to limit the scope of the technology. The use of the terms first, second, etc. does not denote any order or importance, but rather the terms first, second, etc. are used to distinguish one element from another. It should be appreciated that modifications and alterations of the novel method and apparatus described herein may be made. It should be also appreciated that various omissions, replacements, and modifications may be made in the method and the apparatus described herein, without departing from the scope of the spirit of the technology. The technology is intended to include such modifications and alterations in so far as they fall within the scope of the appended claims or the equivalents thereof.

The vehicle controller 23 illustrated in FIG. 2 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the vehicle controller 23. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the vehicle controller 23 illustrated in FIG. 2.

The invention claimed is:

1. An automated driving assist apparatus comprising:
a traveling-environment-information acquirer configured to acquire a front traveling environment in front of an own vehicle;
a traffic information acquirer configured to acquire, from a central controller, road traffic information covering a target traveling course on which the own vehicle is to automatically travel;
a traffic congestion determiner configured to determine, on a basis of the road traffic information acquired by the traffic information acquirer, whether a lane regulation zone is set on the target traveling course, and to determine, in a case where the lane regulation zone is set, whether a passing lane adjacent to the lane regulation zone is congested on a basis of the road traffic information acquired by the traffic information acquirer;
a distance comparator configured to calculate, when the traffic congestion determiner determines that the passing lane adjacent to the lane regulation zone is congested, a distance to the lane regulation zone and an estimated distance to a traffic queue on a basis of the road traffic information acquired by the traffic information acquirer, and to compare the distance to the lane regulation zone with the estimated distance to the traffic queue, the distance to the lane regulation zone comprising a distance from the own vehicle to a start position of the lane regulation zone, the estimated distance to the traffic queue comprising an estimated distance from the own vehicle to a tail end of the traffic queue;
a lane-change start determiner configured to determine, in a case where the distance comparator determines that the distance to the lane regulation zone is longer than the estimated distance to the traffic queue, whether the estimated distance to the traffic queue reaches a lane-change start distance, the lane-change start distance being preset and extending to the tail end of the traffic queue; and
a lane-change controller configured to cause, when the lane-change start determiner determines that the estimated distance to the traffic queue reaches the lane-change start distance, the own vehicle to make a lane change.

2. The automated driving assist apparatus according to claim 1, wherein the distance comparator configured to:
calculate a traffic congestion correction distance on a basis of a moving speed of the traffic queue, a number of vehicles to be added to the tail end of the traffic queue, and a density of vehicles present on an entire road between the own vehicle and the tail end of the traffic queue;
correct, with the traffic congestion correction distance, a shift in distance from the own vehicle to the tail end of the traffic queue due to a time lag between acquisition of the road traffic information by the traffic information acquirer and detection of the road traffic information; and
calculate the estimated distance to the traffic queue.

3. The automated driving assist apparatus according to claim 1, wherein the lane-change start determiner is configured to:
compare, in a case where the distance comparator determines that the distance to the lane regulation zone is longer than the estimated distance to the traffic queue, whether a lane-change available distance preset and extending from the tail end of the traffic queue and a lane-change permission distance determined on a basis of the start position of the lane regulation zone; and
determine, when determining that the lane-change available distance is longer than the lane-change permission distance, whether the estimated distance to the traffic queue reaches the lane-change start distance.

4. The automated driving assist apparatus according to claim 2, wherein the lane-change start determiner is configured to:
compare, in a case where the distance comparator determines that the distance to the lane regulation zone is longer than the estimated distance to the traffic queue, whether a lane-change available distance preset and extending from the tail end of the traffic queue and a lane-change permission distance determined on a basis of the start position of the lane regulation zone; and
determine, when determining that the lane-change available distance is longer than the lane-change permission distance, whether the estimated distance to the traffic queue reaches the lane-change start distance.

5. The automated driving assist apparatus according to claim 3, wherein the lane-change start determiner is configured to calculate the lane-change available distance through subtraction of the estimated distance to the traffic queue from the distance to the lane regulation zone and addition of a predetermined intervehicle distance to a resultant value of the subtraction.

6. The automated driving assist apparatus according to claim 4, wherein the lane-change start determiner is configured to calculate the lane-change available distance through subtraction of the estimated distance to the traffic queue from the distance to the lane regulation zone and addition of a predetermined intervehicle distance to a resultant value of the subtraction.

7. The automated driving assist apparatus according to claim 3, wherein
the lane-change start determiner is configured to compare, when the distance comparator determines that the distance to the lane regulation zone is shorter than the estimated distance to the traffic queue, the distance to the lane regulation zone with a sum of the lane-change permission distance and a lane change distance necessary for the own vehicle to make a lane change; and
the lane-change controller is configured to cause, when the distance comparator determines that the distance to the lane regulation zone is shorter than the sum of the lane-change permission distance and the lane change distance, the own vehicle to make a lane change.

8. The automated driving assist apparatus according to claim 4, wherein
the lane-change start determiner is configured to compare, when the distance comparator determines that the distance to the lane regulation zone is shorter than the estimated distance to the traffic queue, the distance to the lane regulation zone with a sum of the lane-change permission distance and a lane change distance necessary for the own vehicle to make a lane change; and
the lane-change controller is configured to cause, when the distance comparator determines that the distance to the lane regulation zone is shorter than the sum of the lane-change permission distance and the lane change distance, the own vehicle to make a lane change.

9. The automated driving assist apparatus according to claim 5, wherein
the lane-change start determiner is configured to compare, when the distance comparator determines that the distance to the lane regulation zone is shorter than the estimated distance to the traffic queue, the distance to the lane regulation zone with a sum of the lane-change permission distance and a lane change distance necessary for the own vehicle to make a lane change; and the lane-change controller is configured to cause, when the distance comparator determines that the distance to the lane regulation zone is shorter than the sum of the lane-change permission distance and the lane change distance, the own vehicle to make a lane change.

10. The automated driving assist apparatus according to claim 6, wherein
the lane-change start determiner is configured to compare, when the distance comparator determines that the distance to the lane regulation zone is shorter than the estimated distance to the traffic queue, the distance to the lane regulation zone with a sum of the lane-change permission distance and a lane change distance necessary for the own vehicle to make a lane change; and
the lane-change controller is configured to cause, when the distance comparator determines that the distance to the lane regulation zone is shorter than the sum of the lane-change permission distance and the lane change distance, the own vehicle to make a lane change.

11. The automated driving assist apparatus according to claim 1, wherein the lane-change controller is configured to cause, when detecting a vehicle running on the passing lane side by side with the own vehicle, the own vehicle trying to make a lane change toward the passing lane to keep traveling on a current traveling lane.

12. The automated driving assist apparatus according to claim 2, wherein the lane-change controller is configured to cause, when detecting a vehicle running on the passing lane side by side with the own vehicle, the own vehicle trying to make a lane change toward the passing lane to keep traveling on a current traveling lane.

13. The automated driving assist apparatus according to claim 3, wherein the lane-change controller is configured to cause, when detecting a vehicle running on the passing lane side by side with the own vehicle, the own vehicle trying to make a lane change toward the passing lane to keep traveling on a current traveling lane.

14. The automated driving assist apparatus according to claim 4, wherein the lane-change controller is configured to cause, when detecting a vehicle running on the passing lane side by side with the own vehicle, the own vehicle trying to make a lane change toward the passing lane to keep traveling on a current traveling lane.

15. The automated driving assist apparatus according to claim 5, wherein the lane-change controller is configured to cause, when detecting a vehicle running on the passing lane side by side with the own vehicle, the own vehicle trying to make a lane change toward the passing lane to keep traveling on a current traveling lane.

16. The automated driving assist apparatus according to claim 6, wherein the lane-change controller is configured to cause, when detecting a vehicle running on the passing lane side by side with the own vehicle, the own vehicle trying to make a lane change toward the passing lane to keep traveling on a current traveling lane.

17. An automated driving assist apparatus comprising:
a detector configured to acquire a front traveling environment in front of an own vehicle; and
circuitry configured to
acquire, from a central controller, road traffic information covering a target traveling course on which the own vehicle is to automatically travel,
determine, on a basis of the acquired road traffic information, whether a lane regulation zone is set on the target traveling course, and determine, in a case where the lane regulation zone is set, whether a passing lane adjacent to the lane regulation zone is congested on a basis of the acquired road traffic information, calculate, when it is determined that the passing lane adjacent to the lane regulation zone is congested, a distance to the lane regulation zone and an estimated distance to a traffic queue on a basis of the acquired road traffic information, the distance to the lane regulation zone comprising a distance from the own vehicle to a start position of the lane regulation zone, the estimated distance to the traffic queue comprising an estimated distance from the own vehicle to a tail end of the traffic queue, compare the distance to the lane regulation zone with the estimated distance to the traffic queue, determine, when it is determined that the distance to the lane regulation zone is longer than the estimated distance to the traffic queue, whether the estimated distance to the traffic queue reaches a lane-change start distance, the lane-change start distance being preset and extending from the own vehicle to the tail end of the traffic queue, and cause, when it is determined that the estimated distance to the traffic queue reaches the lane-change start distance, the own vehicle to make a lane change.

* * * * *